US007985013B2

(12) United States Patent
Yasuda

(10) Patent No.: US 7,985,013 B2
(45) Date of Patent: Jul. 26, 2011

(54) VEHICLE LIGHTING DEVICE

(75) Inventor: Yuji Yasuda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 311 days.

(21) Appl. No.: 12/211,944

(22) Filed: Sep. 17, 2008

(65) Prior Publication Data

US 2009/0080211 A1 Mar. 26, 2009

(30) Foreign Application Priority Data

Sep. 20, 2007 (JP) ................................. 2007-244284

(51) Int. Cl.
*B60Q 1/00* (2006.01)

(52) U.S. Cl. ........ 362/547; 362/294; 362/373; 362/507; 362/546

(58) Field of Classification Search .................. 362/507, 362/523, 546, 547, 218, 264, 345, 294, 373
See application file for complete search history.

(56) References Cited

U.S. PATENT DOCUMENTS

| | | | | |
|---|---|---|---|---|
| 6,634,771 | B2 * | 10/2003 | Cao | 362/294 |
| 2002/0044455 | A1 * | 4/2002 | Ozawa et al. | 362/547 |
| 2004/0184284 | A1 * | 9/2004 | Buelow et al. | 362/547 |
| 2004/0202007 | A1 | 10/2004 | Yagi et al. | |
| 2005/0122735 | A1 | 6/2005 | Watanabe et al. | |
| 2006/0076572 | A1 * | 4/2006 | Huber et al. | 257/99 |
| 2007/0008727 | A1 | 1/2007 | Chinniah et al. | |
| 2007/0076422 | A1 * | 4/2007 | Nicolai | 362/547 |
| 2007/0091632 | A1 * | 4/2007 | Glovatsky et al. | 362/547 |
| 2008/0144329 | A1 * | 6/2008 | Okuda | 362/539 |

FOREIGN PATENT DOCUMENTS

| | | | |
|---|---|---|---|
| DE | 10 2005 043 499 | A1 | 3/2007 |
| EP | 0 202 335 | A1 | 11/1986 |
| JP | 2006-294263 | A | 10/2006 |
| JP | 2006-332052 | A | 12/2006 |
| WO | 2005/116520 | A1 | 12/2005 |

OTHER PUBLICATIONS

Extended European Search Report dated Oct. 21, 2008.

* cited by examiner

*Primary Examiner* — Ali Alavi
*Assistant Examiner* — Mary Zettl
(74) *Attorney, Agent, or Firm* — Sughrue Mion, PLLC

(57) ABSTRACT

A vehicle lighting device is provided with: a lamp chamber defined by a lamp body and a cover; a light source unit including a semiconductor light emitting element as a light source and provided within the lamp chamber; a metallic heat transfer member attached to the lamp body and penetrating between an outside and an inside of the lamp chamber; and an air blower disposed between the light source unit and the heat transfer member so that an air blowing direction of the air blower directs toward the heat transfer member.

5 Claims, 4 Drawing Sheets

VEHICLE LIGHTING DEVICE

This application claims foreign priority from Japanese Patent Application No. 2007-244284 filed on Sep. 20, 2007, the entire contents of which are hereby incorporated by reference.

BACKGROUND OF THE INVENTION

1. Field of the Invention

The present invention relates to a vehicle lighting device a headlamp or the like using a semiconductor light emitting element (hereinafter referred to as an LED) as a light source and having a heat radiation structure.

2. Background Art

As an example of a conventional vehicle lighting device Patent Document 1 discloses a vehicle lighting device provided with a ventilating path formed inside an outer housing and an air blowing fan in the ventilating path.

As illustrated in FIG. 4, the vehicle lighting device 70 disclosed in the Patent Document 1 is configured to attach each outer lens heating portion 72 to each LED 71 serving as a light source so that heat is transferred to each outer lens heating portion 72 from an associated one of the LEDs 71. Further, a ventilating path 75 is provided inside an outer housing 74 to which an outer lens 73 is fixed. Thus, the outer lens heating portion 72 is placed in the ventilating path 75 in the vicinity of the outer lens 73. Consequently, heat which is transferred to the outer lens heating portion 72 and is generated when the LEDs 71 emit light, is radiated by an air blowing fan 76 disposed in the ventilating path 75.

Moreover, Patent Document 2 discloses another example of a conventional vehicle lighting device which is provided with a housing having a cooling unit, and with an LED attached to a moving plate.

Furthermore, as illustrated in FIG. 5, the vehicle lighting device 80 disclosed in the Patent Document 2 is configured to perform a directional control by attaching an LED 81 to a moving plate 82 . The vehicle lighting device 80 is configured so that a stationary heat radiator 84 provided in a housing 83 is disposed in the vicinity of a cold place of an automobile, that a moving radiator 85 is attached to the vicinity of the LED 81 , and that a convective flow is forcibly generated between the stationary heat radiator 84 and the moving heat radiator 85 by a convective flow generating means 86.

[Patent Document 1] JP-A-2006-294263

[Patent Document 2] JP-A-2006-332052

However, the vehicle lighting device 70 disclosed in the Patent Document 1 is configured so that heat radiated by the LED 71 , the luminous efficiency of which decreases at high temperature, is cooled by the outer lens heating portion 72 in the ventilating path 75 located distant from the LED 71 . Thus, it is difficult to improve heat radiation performance.

In addition, because only the temperature of the outer lens heating portion 72 cooled in the ventilating path 75 is given to the outer lens 73 , it is difficult to improve the snow melting performance of the outer lens 73.

On the other hand, the vehicle lighting device 80 disclosed by the Patent Document 2 is configured so that the convective flow generating means 86 introduces outside air into the housing 83, dust or the like mixed in the outside air is introduced thereinto. Thus, there is a fear of degradation in the luminance characteristics of the lamp.

SUMMARY OF THE INVENTION

One or more embodiments of the invention provide a vehicle lighting device capable of improving a snow melting performance due to an internal convection thereof and a heat radiation performance thereof.

In accordance with one or more embodiments of the invention, a vehicle lighting device is provided with: a lamp chamber defined by a lamp body and a cover; a light source unit including a semiconductor light emitting element as a light source and provided within the lamp chamber; a metallic heat transfer member attached to the lamp body and penetrating between an outside and an inside of the lamp chamber; and an air blower disposed between the light source unit and the heat transfer member so that an air blowing direction of the air blower directs toward the heat transfer member.

According to the vehicle lighting device of the aforementioned configuration, the air blower disposed between the light source unit and the heat transfer member causes a fluid, which absorbs heat generated when the semiconductor light emitting element emits light, to flow into a circulation path that extends around the inside of the lamp chamber and that returns to the heat transfer member. Consequently, the snow melting performance can be improved by the internal convection which does not introduce a fluid externally. Accordingly, the heat radiation performance can be improved.

In the vehicle lighting device of the aforementioned configuration, the heat transfer member may include at least fins protruding into the lamp chamber.

According to the vehicle lighting device of such a configuration, the heat transfer member is provided with fins. Thus, absorbed heat, which is generated when the semiconductor light emitting element emits light, can efficiently be radiated via the fins. The heat radiation performance can be further improved.

In the vehicle lighting device of the aforementioned configuration, the heat transfer member may include fins extending from a rear portion to an upper portion of the lamp chamber.

According to the vehicle lighting device of such a configuration, the fins extending from a rear portion to an upper portion of the lamp chamber functions as an exhaust air duct of the air blower. A temperature-raised fluid absorbing heat, which is generated when the semiconductor light emitting element emits light, is caused to flow from the rear portion of the lamp chamber to an upper portion of the lamp chamber. Thus, the fluid can efficiently be flowed to a front cover. Consequently, the speed of the fluid in the circulation path is not reduced. Accordingly, the heat radiation performance can be improved with a simple structure.

In the vehicle lighting device of the aforementioned configuration, the light source unit may include a metallic bracket tiltably supported in the lamp chamber, a plurality of said semiconductor light emitting elements and an optical member which are mounted on the bracket, and a bracket-side heat transfer member heat-transferably connected to the bracket. The air blower is disposed to direct a suction direction to the bracket-side heat transfer member. Incidentally, the optical members include a reflector, a projection lens, and so on.

According to the vehicle lighting device of such a configuration, the air blower can efficiently eliminate heat, which is absorbed by a temperature-raised fluid and is generated when the semiconductor light emitting element emits light, by sucking the fluid in the vicinity of the bracket-side heat transfer member heat-transferably connected to the bracket functioning as a heat sink.

In the vehicle lighting device of the aforementioned configuration, the heat transfer member is detachably attached to the lamp body.

According to the vehicle lighting device of such a configuration, e.g., in a case where necessity for replacing the air blower arises, an operation of replacing the air blower can easily be performed by removing the heat transfer member functioning as a cap for service. In addition, a placement space at the side of the rear surface of the lamp body can be effectively utilized, because there is no necessity for additionally providing a cap for service.

The vehicle lighting device according to the embodiments of the invention is provided with a light source unit using a semiconductor light emitting element provided as a light source in a lamp chamber defined by a lamp body and a cover and can improve the snow melting performance due to the internal convection thereof and the heat radiation performance thereof.

Other aspects and advantages of the invention will be apparent from the following description, the drawings and the claims.

DETAILED DESCRIPTION OF THE EXEMPLARY EMBODIMENTS

Hereinafter, exemplary embodiments of a vehicle lighting device according to the invention are described in detail by taking a headlamp as an example.

First Embodiment

Figure 1:
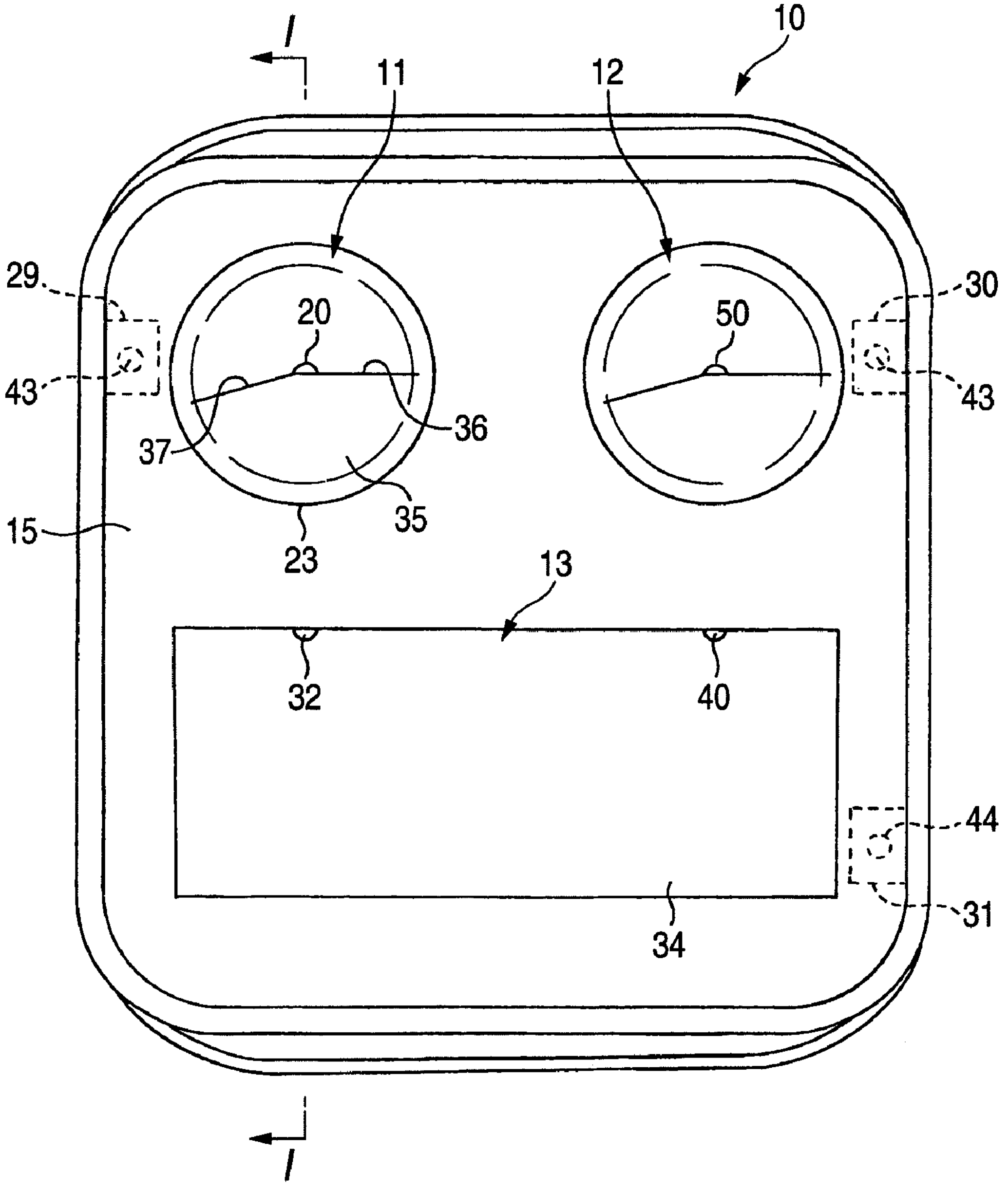
FIG. 1 is a front view illustrating a vehicle lighting device according to a first embodiment of the invention.
Figure 2:
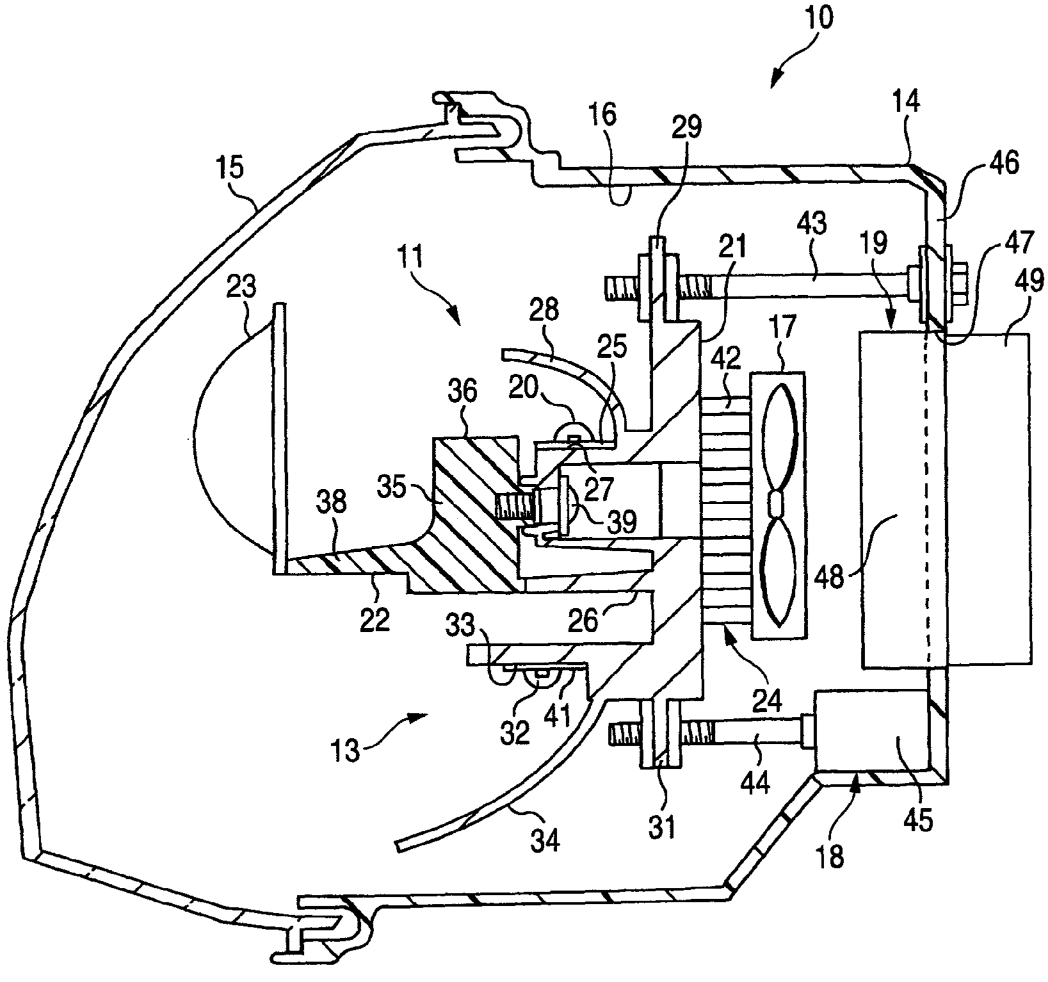
FIG. 2 is a cross-sectional view taken on line I-I shown in FIG. 1, which illustrates the vehicle lighting device illustrated in FIG. 1.

FIGS. 1 and 2 illustrate a first embodiment of a vehicle lighting device according to the invention. FIG. 1 is a front view illustrating the vehicle lighting device according to the first embodiment of the invention. FIG. 2 is a cross-sectional view taken on line I-I shown in FIG. 1, which illustrates the vehicle lighting device illustrated in FIG. 1. Incidentally, in the following description, the terms “front”, “rear”, “left” and “right” are used according to directions from a vehicle. For example, a left side viewed in FIG. 2 is the front side of a vehicle.

A vehicle lighting device 10 according to the present embodiment is attached to a front end of a vehicle. A first light source unit 11 and a second light source unit 12, which are of the poly-ellipsoid (PES) type for low beam type headlamps, are placed on an upper half of the vehicle lighting device 10. A third light source unit 13 of the reflector type for high beam type headlamps is placed on a lower half of the vehicle lighting device 10. FIG. 1 illustrates a right-side headlamp unit (R-headlamp unit) to be attached to a rightward front side of an automobile.

As illustrated in FIGS. 1 and 2, the vehicle lighting device 10 according to the present embodiment includes, in a lamp chamber 16 defined by a lamp body 14 and a translucent cover 15, the first light source unit 11, the second light source unit 12, a third light source unit 13, an air blower (air blower) 17, an optical axis adjusting portion 18, and a body-side heat transfer member 19. Incidentally, in the following description, the description of the second light source unit 12, which is the same as the first light source unit 11, is omitted.

The first light source unit 11 includes a first LED (semiconductor light emitting element) 20, and includes also a bracket 21 for all of the first light source unit 11, the second light source unit 12 and the third light source unit 13, and optical members, i.e., a light base unit 22 and a projection lens 23. The first light source unit 11 includes also a bracket-side heat transfer member 24 for all of the first light source unit 11, the second light source unit 12 and the third light source unit 13.

The first LED 20 is configured so that a circuit board 25 thereof is attached to a top surface fixing part 27 of a projection portion 26 of a bracket 21.

The bracket 21 is formed using a metal member having a high thermal conductivity. The bracket 21 has the projection portion 26, on which the top surface fixing portion 27 is formed, at a central part thereof. The bracket 21 has also a reflector 28 provided on the projection portion 26 to protrude therefrom in a curved manner to surround the first LED 20.

The bracket 21 has also a pair of upper portion fixing flanges 29 and 30 (the fixing flange 30 is illustrated in FIG. 1) upwardly extended in a flange shape. The bracket 21 has also a single lower portion fixing flange 31 downwardly extended in a flange shape.

The bracket 21 has also a bottom surface fixing portion 33 for a third LED 32, and a reflector 34 extended in a curved manner to surround the third LED 32.

Because the bracket 21 is formed using a metal member having a high thermal conductivity, the bracket 21 absorbs heat generated when the first LED 20 and the third LED 32 emit light.

The light base member 22 has a flat surface portion 36 provided in a base portion 35 thereof and has also a tilted surface portion 37 (illustrated in FIG. 1), a surface of which is tilted towards a front side portion of a vehicle. The light base member 22 has also a projection lens fixing portion 38 protruding frontwardly from the base portion 35. The light base member 22 is fixed to the bracket 21 by being screwed with a screw 39 inserted from the projection portion 26 of the bracket 21 thereinto.

The projection lens 23 is a convex lens type aspheric lens and is fixed to the projection lens fixing portion 38 of the bracket 21 on an optical axis of the first LED 20.

The third light source unit 13 includes the third LED 32, and a fourth LED 40 (see FIG. 1). A circuit board 41 of the third LED 32 is attached to the bottom surface fixing portion 33 of the bracket 21. Incidentally, a circuit board (not shown) of the fourth LED 40 is connected to the bottom surface fixing portion 33 side by side with the circuit board 41.

The bracket-side heat transfer member 24 is formed using a metallic member which is made of, e.g., aluminum and has a high thermal conductivity. The bracket-side heat transfer member 24 is a heat sink that has a plurality of transversal fins 42 arranged at intervals in an up-down direction. The bracket-side heat transfer member 24 is heat-transferably formed integrally with the rear surface side of the bracket 21.

The bracket-side heat transfer member 24 absorbs heat which is transferred to the rear surface side of the bracket 21 and is generated when the first LED 20 and the third LED 32 emit light. Then, the bracket-side heat transfer member 24 radiates the heat from the surfaces of the plurality of transversal fins 42.

The air blower 17 is an axial-flow motor having blade bodies. The air blower 17 is attached to the bracket-side heat transfer member 24 by directing a suction direction to the bracket-side heat transfer member 24. Incidentally, the air blower 17 is not limited to the axial-flow motor and can be a blower motor or the like.

The air blower 17 is driven to suck temperature-raised fluid (air) whose heat is radiated by being distributed to the transversal fins 42 of the bracket-side heat transfer member 24, and to discharge the fluid to the side of the body-side heat transfer member 19.

The optical axis adjusting portion 18 includes aiming screw shafts 43 respectively screwed into the upper portion fixing flanges 29 and 30, a leveling screw shaft 44 screwed into the lower portion fixing flange 31, and a leveling adjustment portion (including, e.g., a plus screw) 45, in which the leveling screw shaft 44 is accommodated, under the lamp body 14. Then, the leveling adjustment portion 45 is caused from the outside of the lamp body 14 to advance or retreat to thereby change the position of the lower portion fixing flange 31 with respect to each of the upper portion fixing flanges 29 and 30. Thus, the bracket 21 is tilted to perform the fine adjustment of an optical axis of each of the first light source unit 11, the second light source unit 12, and the third light source unit 13.

The body-side heat transfer member 19 is formed using a metallic member made of, e.g., aluminum having a high thermal conductivity. The body-side heat transfer member 19 is detachably attached to the heat transfer member attaching portion 47 formed on a back plate 46 of the lamp body 14.

The body-side heat transfer member 19 is a composite type heat sink that has a plurality of longitudinal fins 48 laterally arranged at intervals inside the lamp body 14 and that has also a plurality of longitudinal fins 49 laterally arranged at intervals outside the lamp body 14.

The body-side heat transfer member 19 is placed in the vicinity of the air blower 17. Thus, the course of movement of the heat radiation fluid is changed towards the up-down direction of the back plate 46 of the lamp body 14 after the heat radiation fluid discharged by the air blower 17 is distributed by the longitudinal fins 48 provided inside the lamp body 14. Then, the course of movement of the heat radiation fluid is further changed towards the forehand translucent cover 15. In addition, heat of the heat radiation fluid distributed to the longitudinal fins 48 of the body-side heat transfer member 19 is naturally radiated from the longitudinal fins 49 provided outside the lamp body 14.

Such a vehicle lighting device 10 is configured so that the first LED 20 of the first light source unit 11 and the second LED 50 (illustrated in FIG. 1) of the second light source unit 12 are energized from a control circuit (not shown) by switching a low beam switch (not shown) to an on-state, and that the first LED 20 and the second LED 50 emit light. The light emitted from the first LED 20 and the second LED 50 travels to the projection lens 23. In addition, the light emitted from the first LED 20 and the second LED 50 is reflected by the reflector 28. Then, the reflected light travels to and is collected by the projection lens 23. The collected light is transmitted by the translucent cover 15. A low beam of the transmitted light irradiates the rightward front side of a vehicle.

On the other hand, a third LED 32 and a fourth LED 40 of the third light source unit 13 are energized from a control circuit (not shown) in addition to the first LED 20 of the first light source unit 11 and the second LED 50 (illustrated in FIG. 1) of the second light source unit 12 by switching a high beam switch (not shown) to an on-state, and that the first LED 20 and the second LED 50 emit light. The light emitted from the first LED 20, the second LED 50, the third LED 32 and the fourth LED 40 rectilinearly travels to the translucent cover 15. In addition, the light emitted from the third LED 32 and the fourth LED 40 is reflected by the reflector 34. Then, the reflected light is transmitted by the translucent cover 15. A high beam of the transmitted light irradiates the rightward front side of a vehicle.

At that time, heat generated by causing the first LED 20, the second LED 50, the third LED 32, and the fourth LED 40 to emit light is absorbed by the bracket 21. Then, the heat is distributed to and is radiated from the transversal fins 42 of the bracket-side heat transfer member 24. A temperature-raised fluid provided among the transversal fins 42 of the bracket-side heat transfer member 24 is sucked by the air blower 17. The course of movement of the temperature-raised fluid temperature-raised fluid discharged from the air blower 17 is changed by the longitudinal fins 48 of the body-side heat transfer member 19 to the up-down direction of the back plate 46 of the lamp body 14. Then, the course of movement of the heat radiation fluid is further changed towards the forehand translucent cover 15. In addition, heat of the heat radiation fluid is naturally radiated from the longitudinal fins 49 of the body-side heat transfer member 19 to the outside of the lamp chamber 16.

As described above, according to the vehicle lighting device 10 of the first embodiment, the air blower 17 disposed between the body-side heat transfer member 19 and each of the light source units 11, 12, and 13 circulates a temperature-raised fluid, which absorbs heat generated when each of the LEDs 20, 32, 40 and 50 emits light, in a circulation path that extends around the inside of the lamp chamber 16 and that returns to the body-side heat transfer member 19. Consequently, the snow melting performance of the surface of the translucent cover 15 can be improved due to the internal convection thereof without externally introducing a fluid into the path. In addition, the heat radiation performance of the LEDs can be enhanced.

Further, the body-side heat transfer member 19 can efficiently radiate the absorbed heat, which is generated when the LEDs emit light, via each of the longitudinal fins 48 provided inside the lamp body 14 and the longitudinal fins 49 provided outside the lamp body 14 due to the fin shape of each of the fins 48 and 49. Consequently, the heat radiation performance can be improved.

In the body-side heat transfer member 19, the longitudinal fins 48 of the fin shape disposed upwardly from the rear portion of the lamp chamber 16 functions as an exhaust air duct of the air blower 17. Thus, the temperature-raised fluid can be efficiently flowed to the translucent cover 15 after the fluid is guided upwardly from the rear portion of the lamp chamber 16. Consequently, the speed of the fluid in the circulation path is not reduced. Accordingly, the heat radiation performance can be improved with a simple structure.

Further, the air blower 17 sucks the temperature-raised fluid in the vicinity of the bracket-side heat transfer member 24 having a plurality of transversal fins 42 heat-transferably connected to the metallic bracket 21. Thus, heat absorbed by the fluid, which is generated when each of the LEDs 20, 32, 40, and 50 emit light, can efficiently be removed.

Furthermore, e.g., in a case where necessity for replacing the air blower 17 arises, an operation of replacing the air blower 17 can easily be performed by removing the body-side heat transfer member 19 functioning as a cap for service. In addition, there is no necessity for additionally providing the cap for service. Thus, a placement space at the side of the rear surface of the lamp body 14 can be effectively utilized.

Second Embodiment

Figure 3:
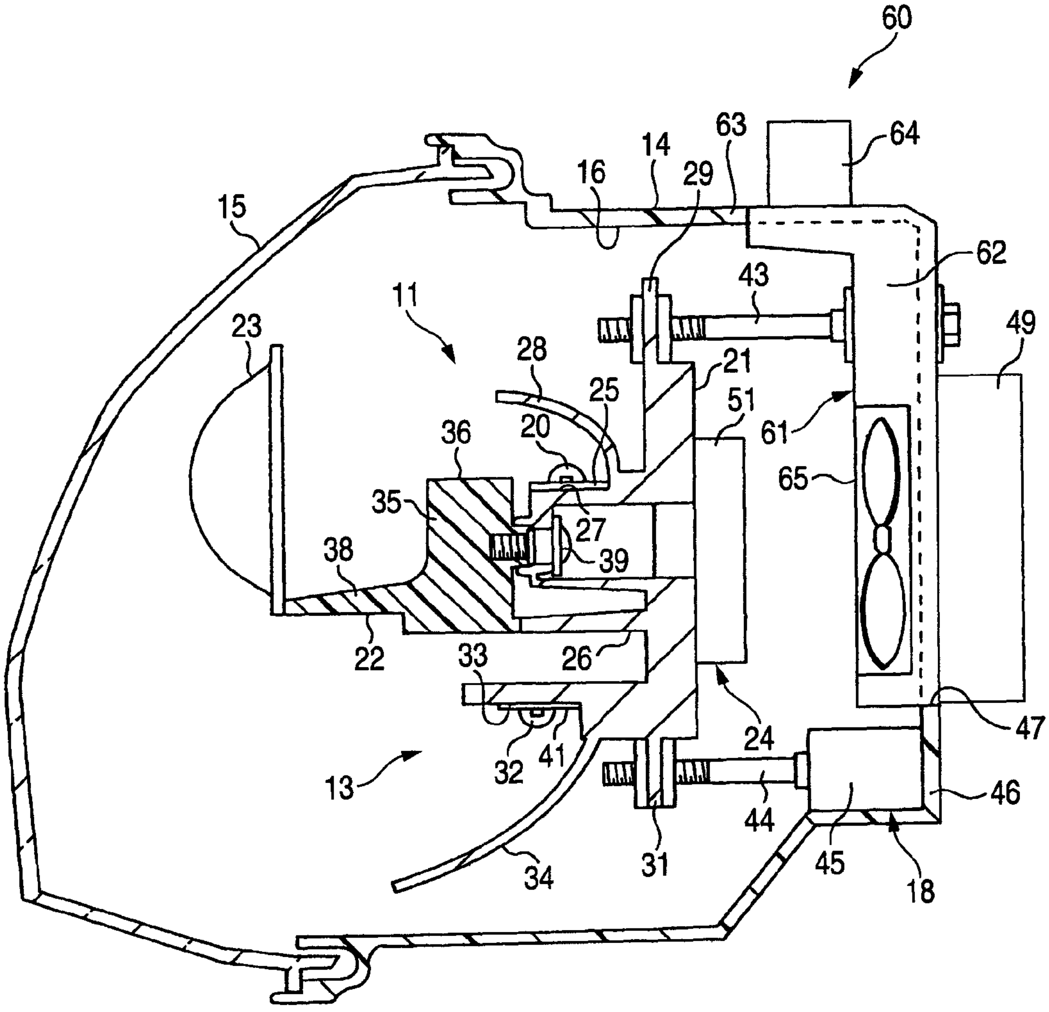
FIG. 3 is a cross-sectional view illustrating a vehicle lighting device according to a second embodiment of the invention, which corresponds to a cross-sectional view taken on line I-I shown in FIG. 1.
Figure 4:
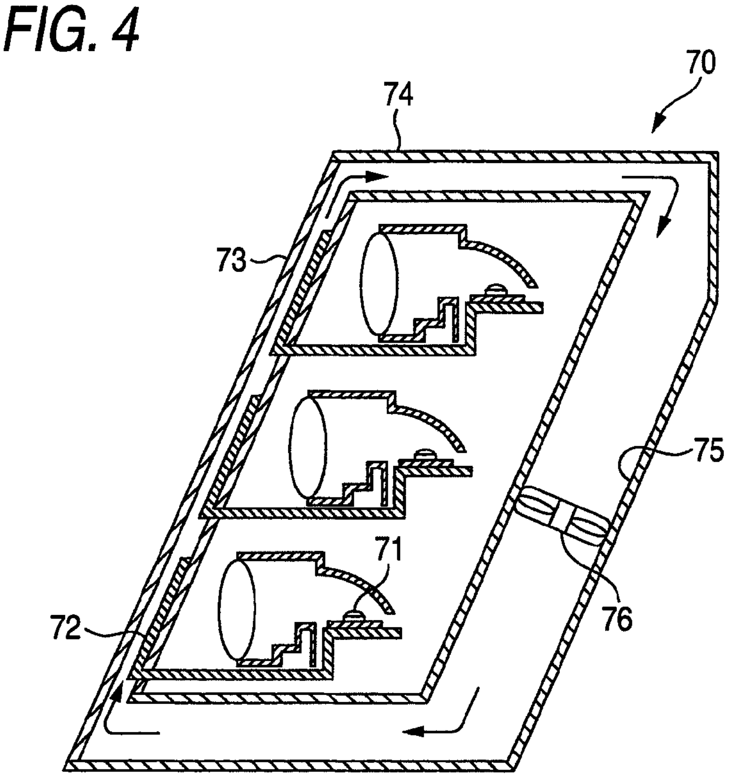
FIG. 4 is a longitudinally cross-sectional view illustrating a conventional vehicle lighting device.
Figure 5:
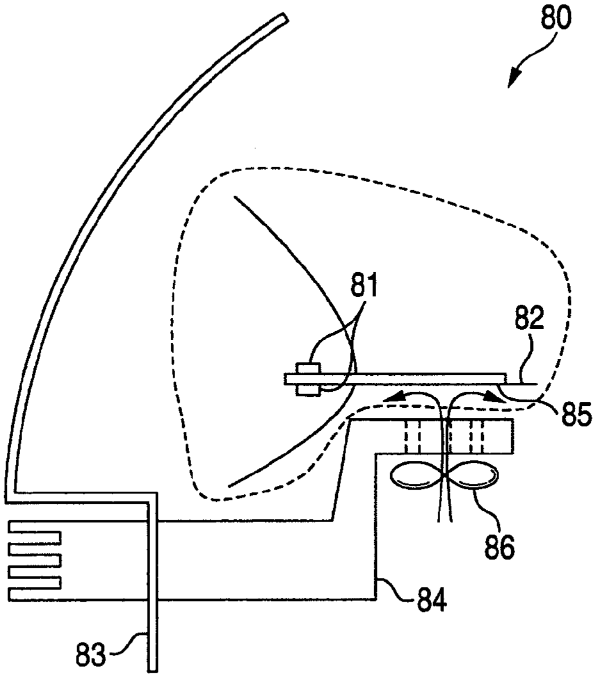
FIG. 5 is a longitudinally cross-sectional view illustrating another conventional vehicle lighting device differing from that illustrated in FIG. 4.

Next, a second embodiment of a vehicle lighting device according to the invention is described below with reference to FIG. 3. FIG. 3 is a cross-sectional view illustrating the vehicle lighting device according to the second embodiment of the invention, which corresponds to a cross-sectional view taken on line I-I shown in FIG. 1. Incidentally, in the following description of the second embodiment, the description of each component, which overlaps with that of the same component or a component having a similar function in the aforementioned first embodiment, is simplified or omitted.

As illustrated in FIG. 3, the vehicle lighting device 60 according to the present embodiment is configured so that the bracket-side heat transfer member 24 has a plurality of longitudinal fins 51 laterally arranged at intervals on the rear surface side of the bracket 21, that the body-side heat transfer member 61 is extended to a top plate 63 with longitudinal fins 62 being along the rear plate 46 of the lamp body 14, that longitudinal fins 49 are further provided outside the back plate 46, and that longitudinal fins 64 are further provided outside the top plate 63. Additionally, the body-side heat transfer member 61 incorporates an air blower 65. Incidentally, other parts are configured similarly to the associated ones of the first embodiment.

The air blower 65 is driven to suck temperature-raised fluid whose temperature is raised by heat absorbed by the bracket 21 and radiated by each of the longitudinal fins 51 of the bracket-side heat transfer member 24 and blow out the fluid such that heat is naturally radiated by the longitudinal fins 49 to the outside of the lamp body 14 while heat is radiated by being distributed to the longitudinal fins 62 of the body-side heat transfer member 61. Further, the course of movement of the temperature-raised is changed towards the top plate 63 from the back plate 46 of the lamp body 14. Furthermore, the course of movement of this temperature-raised is further changed towards the translucent cover 15. Additionally, heat of the temperature-raised fluid is naturally radiated by the longitudinal fins 64 to the outside of the lamp body 14.

The vehicle lighting device 60 according to the second embodiment is similar in operation and advantages to the first embodiment. Therefore, the descriptions of the operation and the advantages of the third embodiment are omitted. However, more particularly, the longitudinal fins 62 of the body-side heat transfer member 61 can forcibly change the course of movement of the temperature-raised fluid towards the top plate 63 from the back plate 46 of the lamp body 14. Further, the heat radiation performance can be further improved by the longitudinal fins 64 provided at the side of the top plate 63 in addition to the longitudinal fins 49 at the side of the back plate 46.

Incidentally, the invention is not limited to the aforementioned embodiments. Appropriate modifications and improvement of the embodiments can be freely made. The materials, shapes, dimensions, numerical values, modes, numbers, arrangement places, and so on are optional and are optional and are not limited to those specific ones of each component of the aforementioned embodiments, as long as the invention can be achieved.

For example, the number of light sources is not limited to three in the case of the illustrated embodiments. Apparently, even in a case where the number of light sources is one, two, or four or more plural, the invention can be implemented.

DESCRIPTION OF REFERENCE NUMERALS AND SIGNS

10 vehicle lighting device
11 first light source unit (light source unit)
12 second light source unit (light source unit)
13 third light source unit (light source unit)
14 lamp body
15 translucent cover
16 lamp chamber
17 air blower
19 body-side heat transfer member (heat transfer member)
20 first LED (semiconductor light emitting element)
21 bracket
22 light base member (optical component)
23 projection lens (optical component)
24 bracket-side heat transfer member
32 third LED (semiconductor light emitting element)
40 fourth LED (semiconductor light emitting element)
42 transversal fin
48 longitudinal fin
49 longitudinal fin
50 second LED (semiconductor light emitting element)
51 longitudinal fin
60 vehicle lighting device
62 longitudinal fin
64 longitudinal fin
65 air blower

What is claimed is:

1. A vehicle lighting device comprising:
a lamp chamber defined by a lamp body and a cover;
a light source unit including a semiconductor light emitting element as a light source and provided within the lamp chamber;
a metallic heat transfer member attached to the lamp body and penetrating between an outside and an inside of the lamp chamber; and
an air blower disposed between the light source unit and the heat transfer member, the air blower configured so that an air blowing direction of the air blower directs air directly toward the heat transfer member and away from the light source unit.

2. The vehicle lighting device according to claim 1, wherein the heat transfer member comprises fins protruding into the lamp chamber.

3. The vehicle lighting device according to claim 1, wherein the heat transfer member comprises fins extending from a rear portion to an upper portion of the lamp chamber.

4. The vehicle lighting device according to claim 1, wherein the light source unit comprises:
a metallic bracket tiltably supported in the lamp chamber;
a plurality of said semiconductor light emitting elements mounted on the bracket;
an optical member mounted on the bracket; and
a bracket-side heat transfer member heat-transferably connected to the bracket, and
wherein the air blower is disposed so that a suction direction of the air blower directs toward the bracket-side heat transfer member.

5. The vehicle lighting device according to claim 1, wherein the heat transfer member is detachably attached to the lamp body.

* * * * *